UNITED STATES PATENT OFFICE.

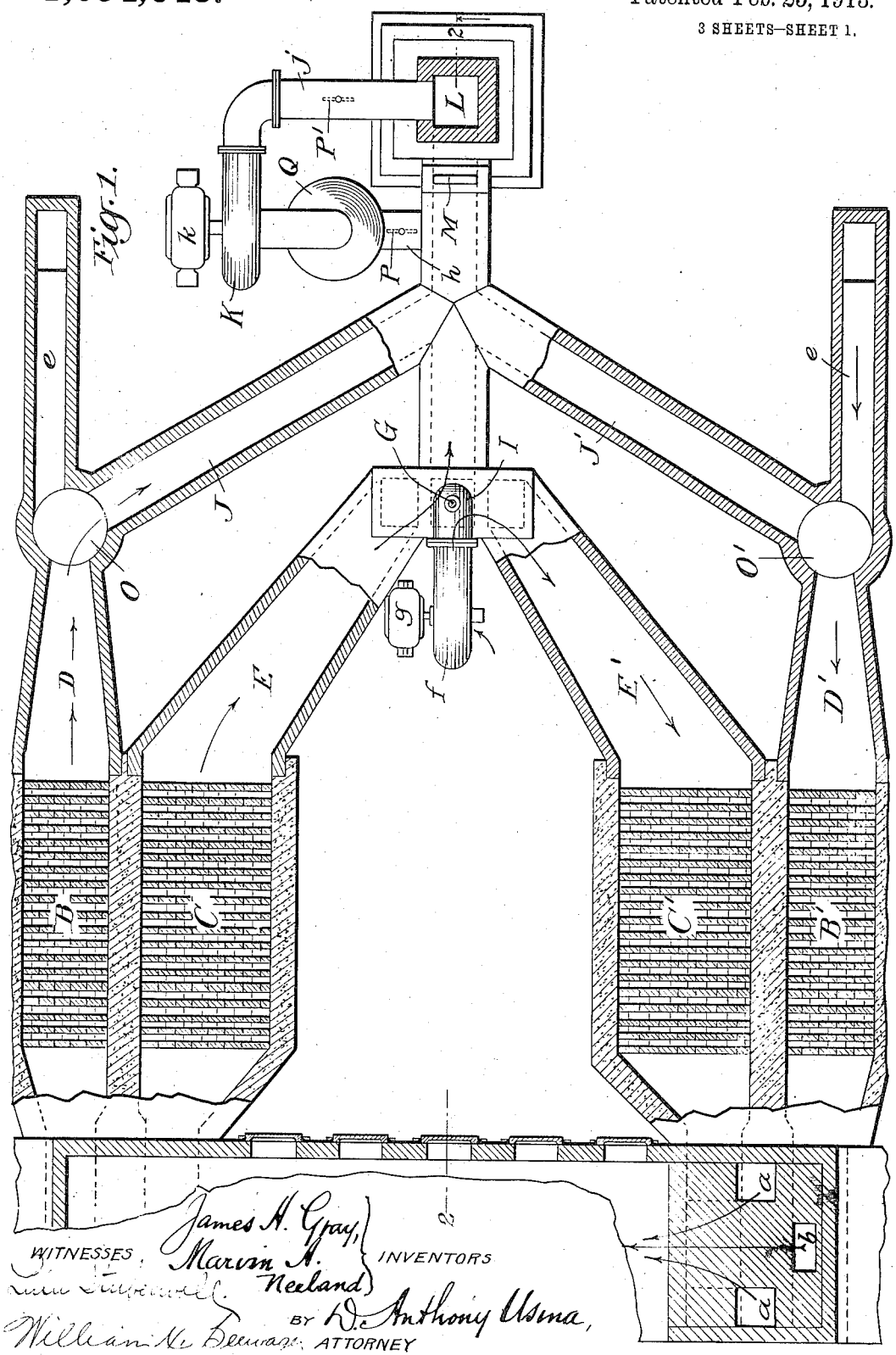

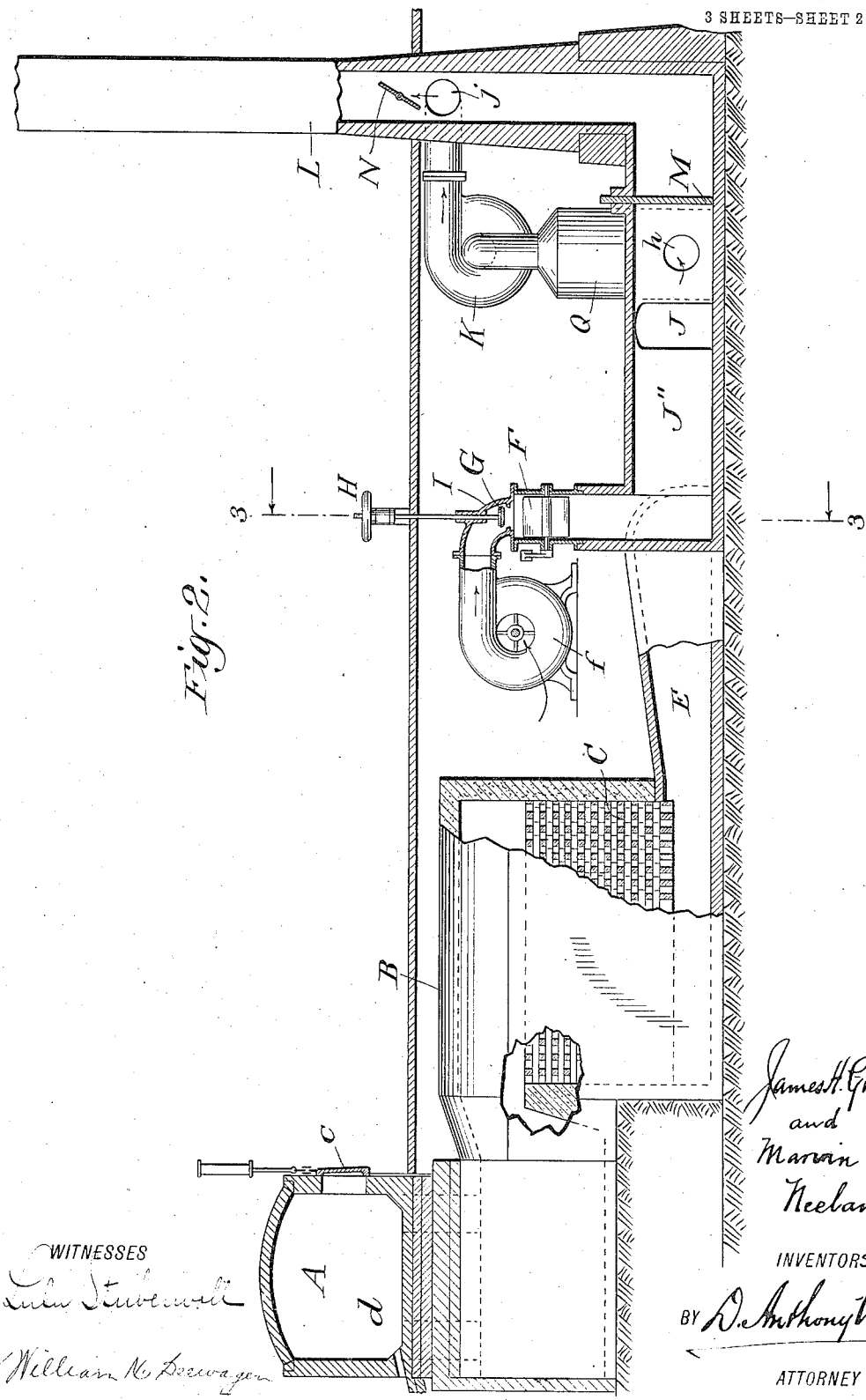

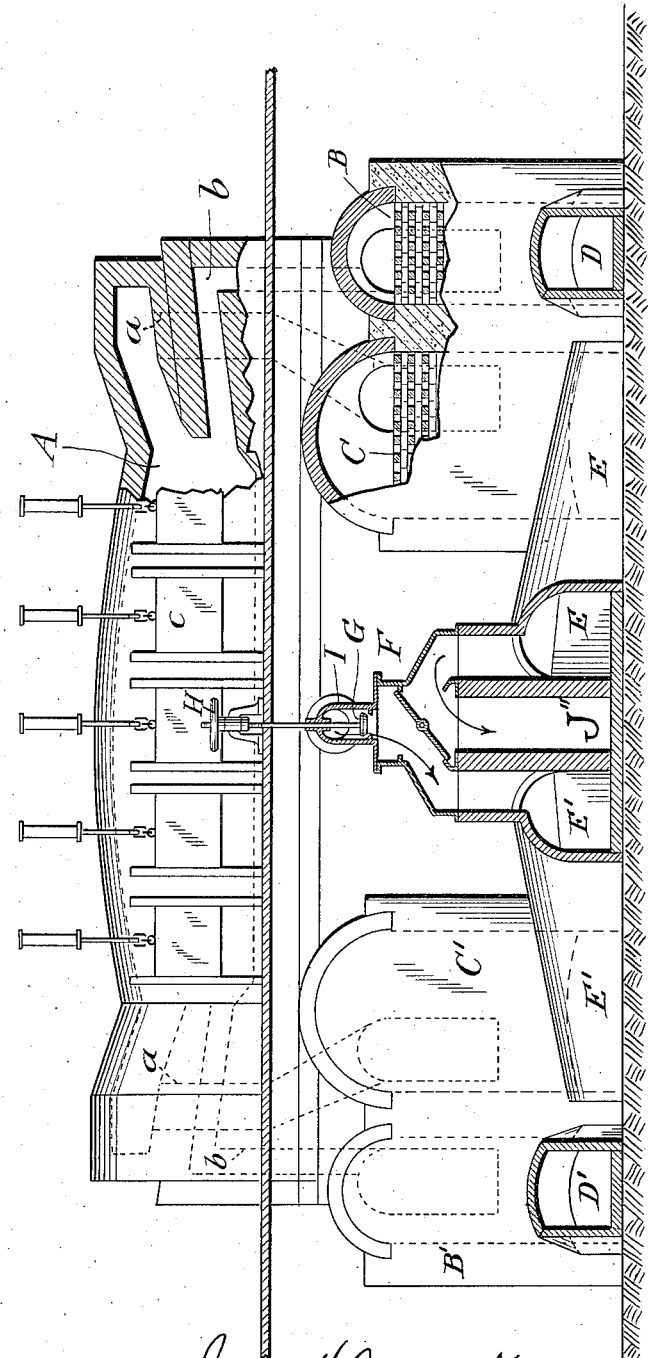

JAMES H. GRAY, OF NEW YORK, N. Y., AND MARVIN A. NEELAND, OF MONTCLAIR, NEW JERSEY.

REGULATION OF REGENERATIVE FURNACES.

1,054,643. Specification of Letters Patent. Patented Feb. 25, 1913.

Application filed March 3, 1911. Serial No. 612,046.

*To all whom it may concern:*

Be it known that we, JAMES H. GRAY, a citizen of the United States, residing in the borough of Manhattan, city, county, and State of New York, and MARVIN A. NEELAND, a citizen of the United States, residing in Montclair, New Jersey, have invented new and useful Improvements in Regulation of Regenerative Furnaces, of which the following is a specification.

This invention aims to provide an improved process for regulating the incoming and outgoing air and gases of regenerative heating or melting furnaces, such for example as the Siemens-Martin or open hearth furnace commonly used in the steel industry. Such furnaces are ordinarily constructed with a pair of regenerative chambers at each end of the furnace which are filled with a checker work of brick. The hot gases leaving the melting room or chamber of the furnace pass out at one end and through the two regenerative chambers at that end of the furnace on their way to the stack. At the same time fuel gas and air for combustion pass through the opposite pair of regenerative chambers and thence into the other end of the furnace. At intervals the direction of flow is reversed and the regenerative chambers which have been heated by the outgoing gases are used to heat the incoming air and fuel gas; while the other pair of regenerative chambers are again heated by the outgoing gases. The furnace is provided with suitable valves by which the flow of air and gases can be reversed as described.

After the furnace has run for a certain period, say ten weeks, the checkers in the regenerative chambers become covered with a crust which is caused by the formation of coke due to decomposition of the fuel gas and also the particles of lime or iron ore, or other materials passing over from the furnace with the outgoing gases, which will flux with the checker brick. This makes it impossible to draw into the furnace sufficient air and gas for combustion, and it is found that the weekly production of the furnace is greatly reduced so that, say toward the twentieth week, the production of the furnace will be reduced twenty-five per cent. Even where the furnace is provided with a stack which might furnish sufficient draft to draw the outgoing gases through the checker work at the outgoing end it is not possible to satisfactorily utilize such draft to pull the air and fuel gas into the furnace because air is sucked in through the cracks about the doors of the furnace. On the other hand, if the ingoing air and gas be put under pressure they will be forced through the checkers into the furnace, but if there be insufficient draft on the outgoing side the gases are forced out of the doors of the furnace and there is improper combustion within the melting room of the furnace. By the present invention these difficulties may be avoided and a good working of the furnace maintained even after the checker work has deteriorated, by forcing the air through the checker work under pressure, the pressure and other conditions being calculated to maintain substantially or approximately atmospheric pressure in the furnace. The quantity of air entering the furnace may be regulated by a valve, such as an auxiliary valve of the air reversing valve, or by regulating the speed made by the fan or other blower; the former method being preferable. The pressure on the fuel gas entering the furnace may be regulated at the gas generators or producers according to the methods commonly employed.

In order to furnish a proper draft for the outgoing gases we preferably provide a fan or similar suction apparatus connected to the flue which leads to the stack or other point of disposal. Or, as an alternative method of regulating the draft upon the outgoing gases a stack alone may be used containing a damper. Ordinarily we provide both the stack and the fan arranged so as to permit the use of either or both at will, and the fan is arranged on the far side of a boiler through which the gases are first passed, both for the purpose of recovering the heat from the gases and for the purpose of cooling the gases and saving the fan from exposure to such high temperatures. The stack or the fan, or the two together, are large enough to draw the gases through the checkers on the offgoing end even when these are dirty. At the beginning of the run of the furnace the stack damper is partly closed and toward the end of the run when the checker work becomes clogged the damper is opened. By the combination of the two fans, or the one fan and the stack with its damper, or equivalent devices for forcing in the air under pressure and for drawing off the gases at the desired rate, the relative pressures between the incoming air and gas and the outgoing gases can be readily regulated to obtain practically atmospheric pressure in the furnace and to use the desired quantity of air and gas while overcoming the gradually increasing resistance of the clogged and dirty checker work.

The quantity of air and gas going through the furnace is maintained constant regardless of the condition of the checker work and the escape of air and gases or the drawing in of air through the cracks of the furnace doors is avoided by first forcing the air and gas into the melting room with sufficient force to maintain atmospheric pressure there and, second, withdrawing the gases from the melting room with sufficient suction to insure the use of the desired quantity of air and fuel gas. The adjustment of the fan or the stack damper at the discharge end determines the quantity of air and fuel gas which can be introduced while maintaining substantially atmospheric pressure in the furnace, and the air and fuel gas supplying means must be accordingly adjusted to provide the desired supply under pressure sufficient to maintain atmospheric pressure in the furnace.

Where natural gas or fuel oil is used instead of producer gas such fuels do not pass through the regenerative chamber on the admission end, but pass directly under regulable pressure into the furnace with the air. The air on the ingoing side however passes through the regenerative chamber or chambers and the gases of combustion through the outgoing regenerative chamber or chambers as above described. And all the ingoing air, whether passing through a single or a double regenerative chamber, comes originally from the fan or other blower. A single regenerative chamber at each end of the furnace is all that is theoretically necessary under such circumstances, but it is usual to make each chamber in duplicate, substantially as in Fig. 1, running the air and waste gases through both impartially. The principle is the same whether single regenerators or duplicate regenerators are used.

It may happen in some plants that the supply of fuel gas is adequate with little or no adjustment of pressure from beginning to end of the run of the furnace; or that the gas regenerating chamber is so large in the beginning that the deterioration thereof is not such as to interfere seriously with the flow of the gas for a comparatively long time. In such cases the furnace may be run with little or no adjustment of the pressure on the gas supply, the only adjustment at the supply end being of the air.

Figure 1 is a horizontal section, partly in plan, of an open hearth furnace of the type commonly used in the steel industry, with the checker work and air and gas passages and flues. Fig. 2 is a vertical section of the same approximately on the line 2—2 of Fig. 1, parts being in elevation for convenience. Fig. 3 is a transverse vertical section approximately on the line 3—3 of Fig. 2.

Referring to these drawings, the melting room or chamber of the furnace is indicated at A. It is provided with air admission ports $a$ and a gas admission port $b$, the ports being duplicated at the opposite ends of the furnace. Connected with the gas port $b$ at one end is a gas regenerative chamber B and connected with the gas port at the other end is an identical chamber B', these chambers containing checker work of any usual or suitable description. Connected with the two air ports $a$ at one end is an air regenerative chamber C, and connected with the air ports at the opposite end is an identical chamber C'; these two chambers being likewise provided with checker work as shown. The furnace or melting room A is provided with charging doors $c$ at one side and with a tapping hole $d$ at the opposite side. Flues D and D' connect the checker work gas regenerative chambers, through three-way valves O and O', with gas admission flues $e$ and $e'$ coming from the producer or other source of gas, or with flues J and J' leading into flues J'' and to the stack or exhaust fan. The valves O and O' are of any ordinary type calculated to put the flues D and D' into communication alternatively with the flues $e$ and J or the flues $e'$ and J'; the two valves being operated so as to put the flue D into communication with the flue J when D' is in communication with $e'$, and vice versa.

The air flues E and E' connect the air regenerative chambers C and C' respectively with a butterfly valve F by which these flues are put in communication alternatively with the exhaust flue J''. When one of the air flues, as E in Fig. 3, is in communication with the exhaust flue J'', the other communicates with the discharge pipe I of a fan $f$ by which air is forced into the air flue E' in quantity controlled by a regulating valve G, the stem of which projects upward and carries a hand wheel H for screwing it up and down. The motor $g$ for operating the fan $f$ may be adjustable in speed by the ordinary commutator or other controlling device.

For drawing gases out of the melting chamber in the desired quantity an exhaust fan K and a stack L are provided, a damper M in the flue J'' serving to cut off the flue J'' from direct communication with the stack and to direct all the exhaust gases through the fan, and a regulating damper N in the stack serving to regulate the cross-section of the latter. The inlet side of the fan K communicates with a boiler Q, the inlet of which in turn is connected with the exhaust flue J″ through a pipe $h$. The discharge end of the fan K communicates through a pipe $j$ with the stack. Dampers P and P′ are provided in the pipes $h$ and $j$ to regulate the flow of gases therethrough and the motor $k$ or other driving means for the fan may be regulated in any usual or suitable way.

Assuming, for example, that ordinary producer gas is being used, this gas comes from the producer to the valve O′ which is thrown so as to conduct the gas through the flue D′ into the gas regenerator B′ and into the furnace A. At the same time air is taken into the fan $f$, forced through the regulating valve G by which the furnace operator regulates the quantity of air going into the furnace, then through the butterfly valve F into the flue E′, the regenerator C′ and thence into the furnace A. The air and gas unite in the furnace and burn, forming gases of combustion, which pass out of the furnace and then impartially through the regenerators B and C, thence through flues D and E. The gases in the flue D pass through the three-way valve O which is thrown so as to conduct them into the flue J″. The gases in the flue E pass through the butterfly valve which is thrown so as to conduct them likewise into the flue J″. The damper M being closed and the dampers P, P′ and N being open, the gases are drawn by the exhaust fan K through the boiler Q and forced into the stack whence they escape into the atmosphere (or the damper M being open and the dampers P and P′ being closed, the gases pass directly into the stack without going through the fan K and are regulated by the damper N). During the passage of gases through the boiler heat is transferred to the water in the boiler for the purpose of making steam which may be utilized in various ways; and by controlling the revolutions of the fan K (or the position of the damper N, or both) in conjunction with a proper control of the pressure of the producer gas and the pressure and quantity of air introduced by the fan $f$ and through the valve G the proper pressure and quantity and the desired combustion are obtained in the furnace A.

It is not essential to measure the pressure or volume of air and gases passing through the various flues or to measure the speed of the fans or the positions of the valves and dampers. The furnace operator can determine by observation of the working of the furnace when the pressure is too high or too low or the quantity of air and gases is too great or too small and can accordingly adjust the mechanism. At the same time the pressure of the producer gas in the flue leading from the producers to the valve O′ is regulated at the producers in the usual manner so as to maintain the proper relative pressures between the air and gas going into the furnace.

At certain intervals of time, usually every fifteen minutes, the three-way gas valves O and O′ and the butterfly valve F are thrown so as to reverse the conditions and to direct the inflowing air and gas through the regenerators previously heated by the outflowing gases of combustion. The flow of the air and all of the gases through the furnace is then in an opposite direction to that of the preceding period, but conditions are exactly the same during all periods except as to the direction of flow of the air and gases.

Though we have described with great particularity of detail certain specific embodiments of our invention, yet it is not to be understood therefrom that the invention is restricted to the specific embodiments described. Various modifications in the steps described may be made by those skilled in the art without departure from the invention.

What we claim is:

1. The method of operating a furnace having regenerative chambers at its opposite ends which consists in forcing air and fuel gas through the admission chambers and into the furnace and withdrawing the gases of combustion through the exhaust chambers, and regulating the introduction of the air and fuel gas and the withdrawal of the gases of combustion so as to provide a determined quantity of air and fuel gas and to maintain substantially atmospheric pressure in the furnace under changing conditions in the regenerative chambers.

2. The method of operating a furnace having a regenerative chamber at each end which consists in feeding fuel into the furnace and forcing air thereinto through the admission chamber and withdrawing the products of combustion through the exhaust chamber, and regulating the introduction of the air and the withdrawal of the gases of combustion so as to provide a determined quantity of air and fuel and to maintain substantially atmospheric pressure in the furnace under changing conditions in the regenerative chambers.

3. The method of operating a furnace having regenerative chambers at its opposite ends which consists in forcing air and fuel gas through the admission chambers and into the furnace and withdrawing the gases of combustion through the exhaust chambers, and regulating the introduction of air and the withdrawal of the gases of combustion so as to provide a determined quantity of air and fuel gas and to maintain substantially atmospheric pressure in the furnace under changing conditions in the regenerative chambers.

4. In combination with an open hearth regenerative furnace, a fan for forcing air through the regenerative chamber into the furnace, a stack for withdrawing the waste gases and a fan for withdrawing the waste gases from the furnace, and means for adjusting the relation between the air introduced into and the waste gases withdrawn from the furnace so as to maintain a uniform pressure within the furnace and to increase or decrease the quantity of air and gases passing through the same.

In witness whereof, we have hereunto signed our names in the presence of two subscribing witnesses.

JAMES H. GRAY.
MARVIN A. NEELAND.

Witnesses:
KENNETH R. HALSTEAD,
D. ANTHONY USINA.